(12) United States Patent
Bethea

(10) Patent No.: US 8,579,112 B2
(45) Date of Patent: Nov. 12, 2013

(54) HOLDING DEVICE FOR PHONE OR OTHER ELECTRONIC DEVICE

(76) Inventor: Webelene Bethea, Chicago, IL (US)

(*) Notice: Subject to any disclaimer, the term of this patent is extended or adjusted under 35 U.S.C. 154(b) by 0 days.

(21) Appl. No.: 13/535,391

(22) Filed: Jun. 28, 2012

(65) Prior Publication Data

US 2012/0261930 A1  Oct. 18, 2012

Related U.S. Application Data

(63) Continuation-in-part of application No. 12/931,562, filed on Feb. 4, 2011, now abandoned.

(51) Int. Cl.
*B65D 85/00* (2006.01)

(52) U.S. Cl.
USPC ............... 206/320; 224/217; 224/930

(58) Field of Classification Search
USPC .......... 206/320, 576, 815; 224/191, 930, 217, 224/162
See application file for complete search history.

(56) References Cited

U.S. PATENT DOCUMENTS

| | | | | |
|---|---|---|---|---|
| 5,964,073 A * | 10/1999 | Harper | .................. | 52/749.14 |
| 6,991,829 B2 * | 1/2006 | Bergman | .................. | 427/429 |
| 7,469,809 B2 * | 12/2008 | Rodarte et al. | .................. | 224/578 |
| 7,600,619 B2 * | 10/2009 | Sapyta | .................. | 190/107 |
| 7,661,567 B2 * | 2/2010 | Myers | .................. | 224/217 |
| 8,479,990 B2 * | 7/2013 | Chiarini | .................. | 235/439 |
| 2007/0295771 A1 * | 12/2007 | Herbig et al. | .................. | 224/191 |
| 2008/0202958 A1 * | 8/2008 | Hanlen et al. | .................. | 206/320 |
| 2012/0043234 A1 * | 2/2012 | Westrup | .................. | 206/320 |

* cited by examiner

*Primary Examiner* — Jacob K Ackun
(74) *Attorney, Agent, or Firm* — Justin Lampel

(57) ABSTRACT

The present invention generally relates to a holding device for a phone or other electronic device. The device has an exterior housing and a generally hollow interior. The back of the exterior housing has a plurality of finger receiving finger loops which pivot from a generally parallel position with respect to the back of the device to a generally perpendicular position with respect to the back of the device. The finger loops may move independently and be independently added or removed from the device.

8 Claims, 4 Drawing Sheets

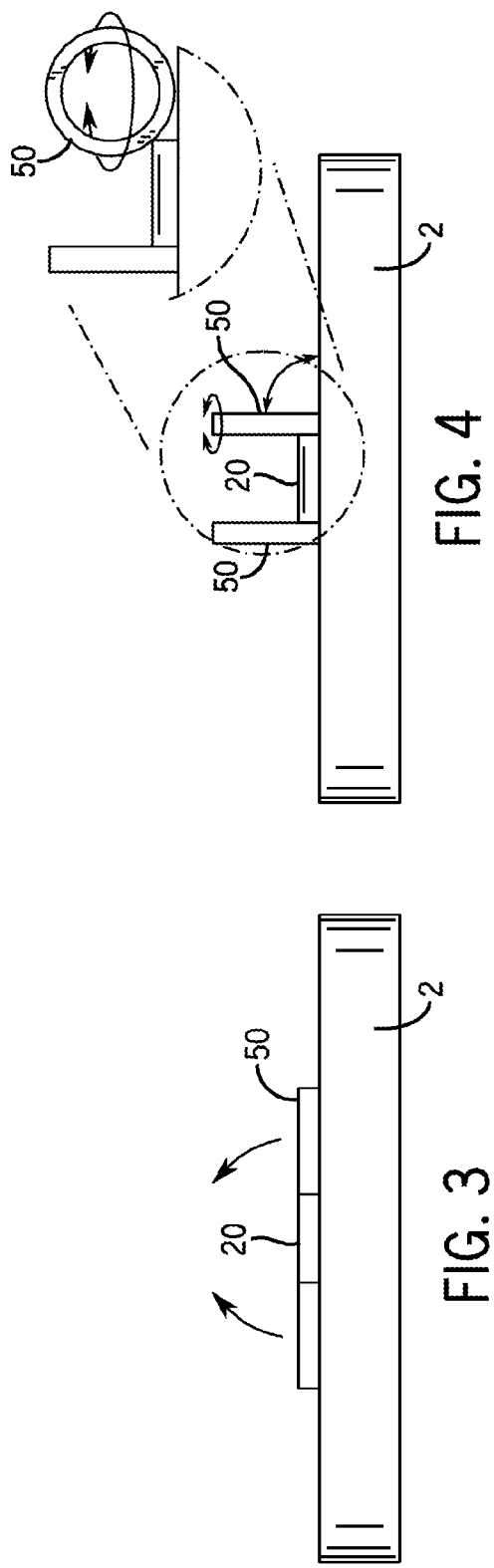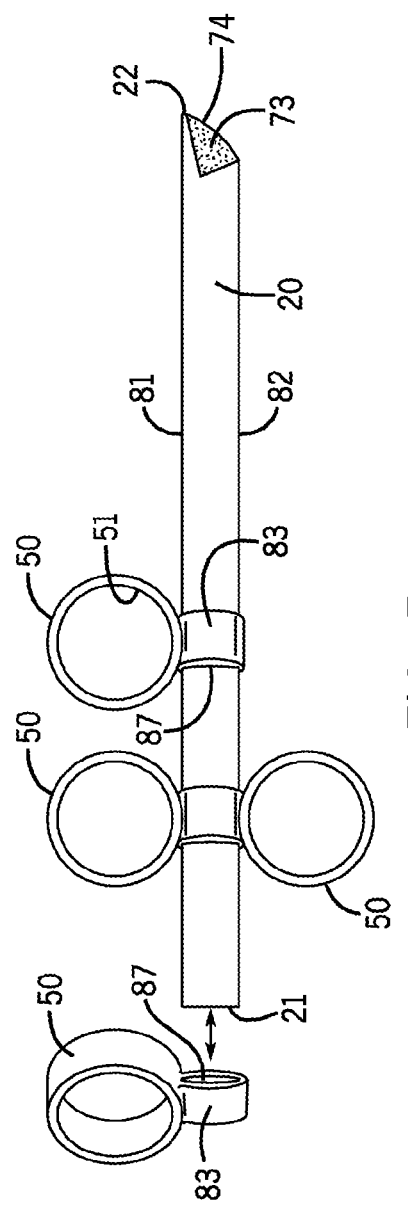

HOLDING DEVICE FOR PHONE OR OTHER ELECTRONIC DEVICE

REFERENCE TO COPENDING APPLICATION

The present application is a continuation-in-part application of U.S. Ser. No. 12/931,562 filed on Feb. 4, 2011, now abandoned, the entire contents of which are incorporated by reference. Applicant claims the priority date of the '562 application.

BACKGROUND OF THE INVENTION

The present invention generally relates to a holding device for a phone or other electronic device. The device has an exterior housing and a generally hollow interior. The back of the exterior housing has a plurality of finger receiving finger loops which pivot from a generally parallel position with respect to the back of the device to a generally perpendicular position with respect to the back of the device. The finger loops may move independently and be independently added or removed from the device.

Holding cases for cell phones or other computer devices are very common. Theses cases generally protect the phones from damage which may render the phone inoperable or at least prevent unsightly scratches on the device. These cases can generally be purchased at any mobile phone store, electronic device store and are even common at kiosks in your local malls. These cases generally come in a wide variety of colors and patterns to suit the fashion (or lack thereof) of the owner of the phone.

Attempts have been made to provide cell phone holders with grasping means. For example, U.S. Patent Publication No. 200060279098 to Shipley discloses a universal finger loop for cellular phones and portable electronic devices of the type having a flexible loop of appropriate size to be penetrated by a human finger and a means for affixing it to a cellular phone or portable electronic device. The loop is positioned at the top of the back side of the device, where it may be easily and ergonomically penetrated by a device user during device interaction, whereby creating an assisted, secure grip between the user and the device. The finger loop may also comprise a transparent, flexible, or elastic strip to encircle the device body or battery cover; a reusable, adjustable closure that can adapt to different device sizes; or a means for adjusting the size of the loop to fit different fingers.

Further, U.S. Patent Publication No. 20110065486 to Bayrami discloses a hard case for the containment of a communication device, such as a cell phone, PDA, or pocket PC. Also, the disclosed invention is a method for use of the hard case as follows, communication device is accessible by pressing push button releasing to open position cover. Further, the disclosed invention has two modes of use. The first mode is the tabletop mode in which the hard case is placed on a surface with hand holding element in open position thus angularly elevating hard case for easy viewing and use of enclosed communication device. The second mode of use, hard case is placed in a single hand with fingers engaging finger holes and hand palm engaging grooved non-slip grip.

However, these publications fail to provide a holding device for a cell phone which allows a user to hold the phone through independently movable finger loops. A need, therefore, exists for an improved device for holding and protecting a cell phone.

SUMMARY OF THE INVENTION

The present invention generally relates to a holding device for a phone or other electronic device. The device has an exterior housing and a generally hollow interior. The back of the exterior housing has a plurality of finger receiving finger loops which pivot from a generally parallel position with respect to the back of the device to a generally perpendicular position with respect to the back of the device. The finger loops may move independently and be independently added or removed from the device.

An advantage of the present device is to provide a cell phone holder with independently moving finger loops which allow a user to comfortable select which fingers to use to hold the cell phone.

Yet another advantage of the present device is that the device allows the independently moving finger loops to move from a generally flat First Position A to a generally perpendicular Second Position B.

Another advantage of the present device is that the device protects a phone from damage.

And another advantage of the present device is to provide a holding device for a cell phone which is lightweight.

Still another advantage of the holding device for a cell phone is to provide a device with finger loops which may rotate along two different axes (vertically and horizontally) with respect to the back of the holding device.

And another advantage of the present holding device for a cell phone is that the device may be used with a variety of different cell phones, computer tablets or other electronic devices.

Yet another advantage of the present holding device for a cell phone is that the device may be manipulated to provide a maximum ergonomically correct posture for the fingers of the user while the user is holding a cell phone.

Still another advantage of the present holding device for a cell phone is that the device may have an antibacterial agent incorporated into the material used to create the device so as to prevent the spreading of germs or other harmful agents.

For a more complete understanding of the above listed features and advantages of the holding device for cell phones reference should be made to the following detailed description of the preferred embodiments and to the accompanying drawings. Further, additional features and advantages of the present invention are described in, and will be apparent from, the detailed description of the preferred embodiments and from the drawings.

BRIEF DESCRIPTION OF THE DRAWINGS

FIG. 3 illustrates a top view of the holding device for a phone wherein the finger loops are in the First Position A.

FIG. 4 illustrates a top view of the holding device for a phone wherein the finger loops are in the Second Position B.

FIG. 5 illustrates a detailed view of the centrally located strap of the holding device for a phone.

DETAILED DESCRIPTION OF THE PREFERRED EMBODIMENTS

The present invention generally relates to a holding device for a phone or other electronic device. The device has an exterior housing and a generally hollow interior. The back of the exterior housing has a plurality of finger receiving finger loops which pivot from a generally parallel position with respect to the back of the device to a generally perpendicular position with respect to the back of the device. The finger loops may move independently and be independently added or removed from the device.

Figure 1:
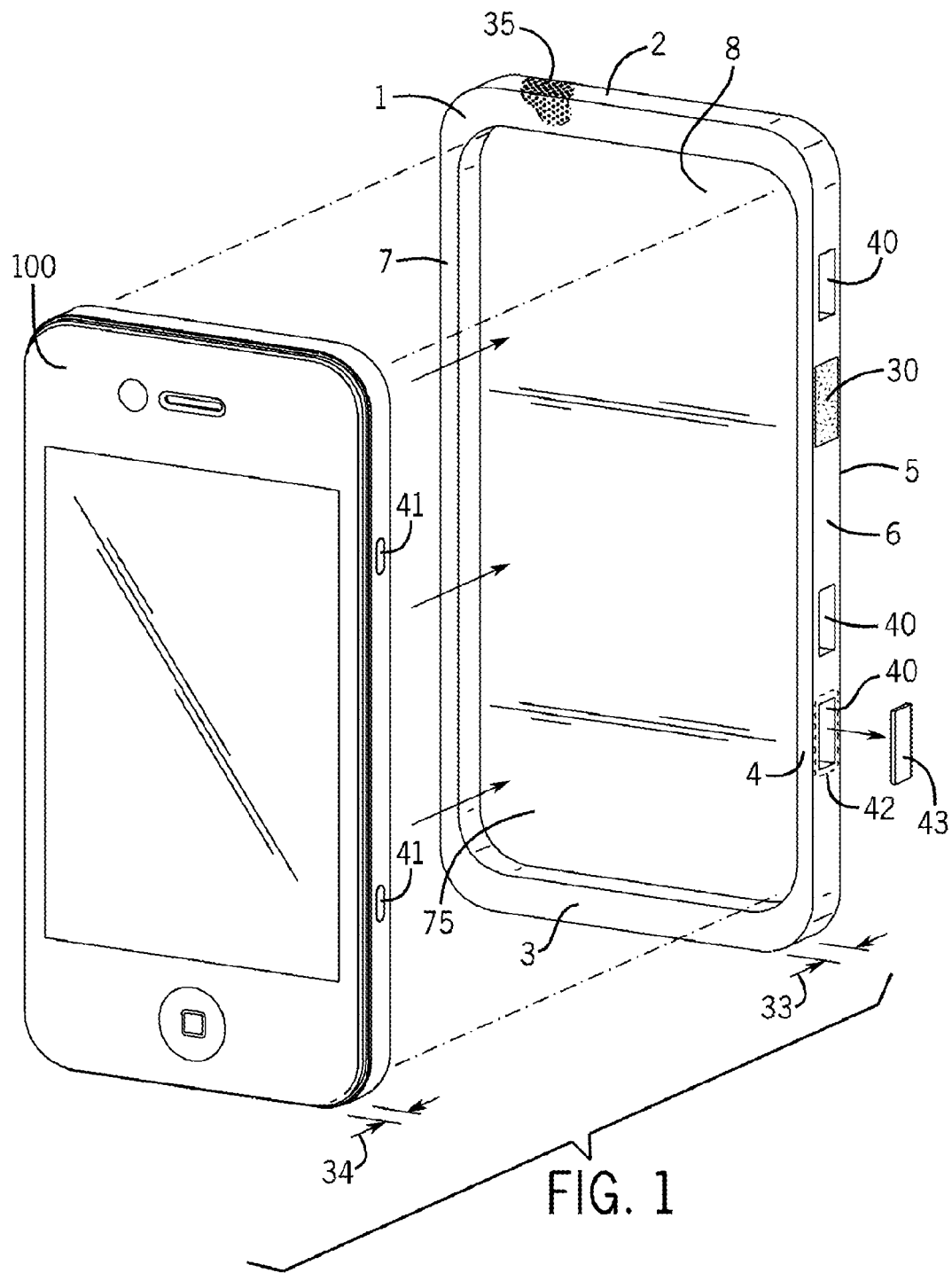
FIG. 1 illustrates a front perspective view of the device wherein a phone is being inserted into the interior of the device.

Referring now to the drawings, FIG. 1 generally illustrates a holding case 1 for a phone (or other electronic device) 100. Although the remainder of the application may state the device to be held is a "phone" 100, it should be understood that the device being held may be a wide variety of computer devices including, but not limited to, a computer tablet, a laptop, a personal digital assistant, or any other device.

The device 1 is preferably made from a rubber or plastic material; however, any suitable material may be used. In an embodiment, an antibacterial agent 35 may be incorporated into the material used to create the device 1 so as to prevent the spreading of germs or other harmful agents.

The device 1 may have a top 2, a bottom 3, a front 4, a back 5, a first side 6 and a second side 7. The first side 6 and second side 7 of the holding device 1 may have a width 33 which may be slightly greater than a width 34 of the cell phone 100. The device 1 may further have a generally hollow interior 8. The generally hollow interior 8 of the device 1 may be especially suitable for storing, securing and protecting, for example, the phone 100. The generally hollow interior 8 may be accessible through the large main opening 75 located on, for example, the front 4 of the device 1. The large main opening 75 may have a perimeter which is slightly less than an outer perimeter of the device 1. The main opening 75 on the front 4 of the device 1 may allow the user to view and manipulate a touch screen or button commands of the phone 100.

The top 2, bottom 3, back 5, first side 6 and second side 7 may have a portion having a rough surface strip 30. The rough surface strip 30 may aid in the grasping of the device 1 by preventing slippage of the device 1 from the user's hand.

In an embodiment, a plurality of openings 40 may be located along, for example, the top 2, bottom 3, back 5, first side 6 and/or second side 7 of the device 1. The plurality of openings 40 on the device 1 may allow a user to access the ports 41 of the phone 100 through the holding device 1. More specifically, the plurality of openings 40 may allow a user to access, for example, the battery charging port 41 or headphone port of the device 1 without the need to remove the device 1 from the phone 100. Preferably, the device 1 is tailored to specific phones 100 such that the pluralities of openings 40 of the device 1 substantially match the size and location of the ports 41 of the phone 100. In an embodiment, the plurality of openings 40 may have a perforation line 42 around the same in which the user may electively remove a protective cover 43 which is secured to the device 1. As a result, the user may electively remove or keep the protective cover 43 over each of the plurality of openings 40 to expose the ports 41 of the phone 100.

Figure 2:
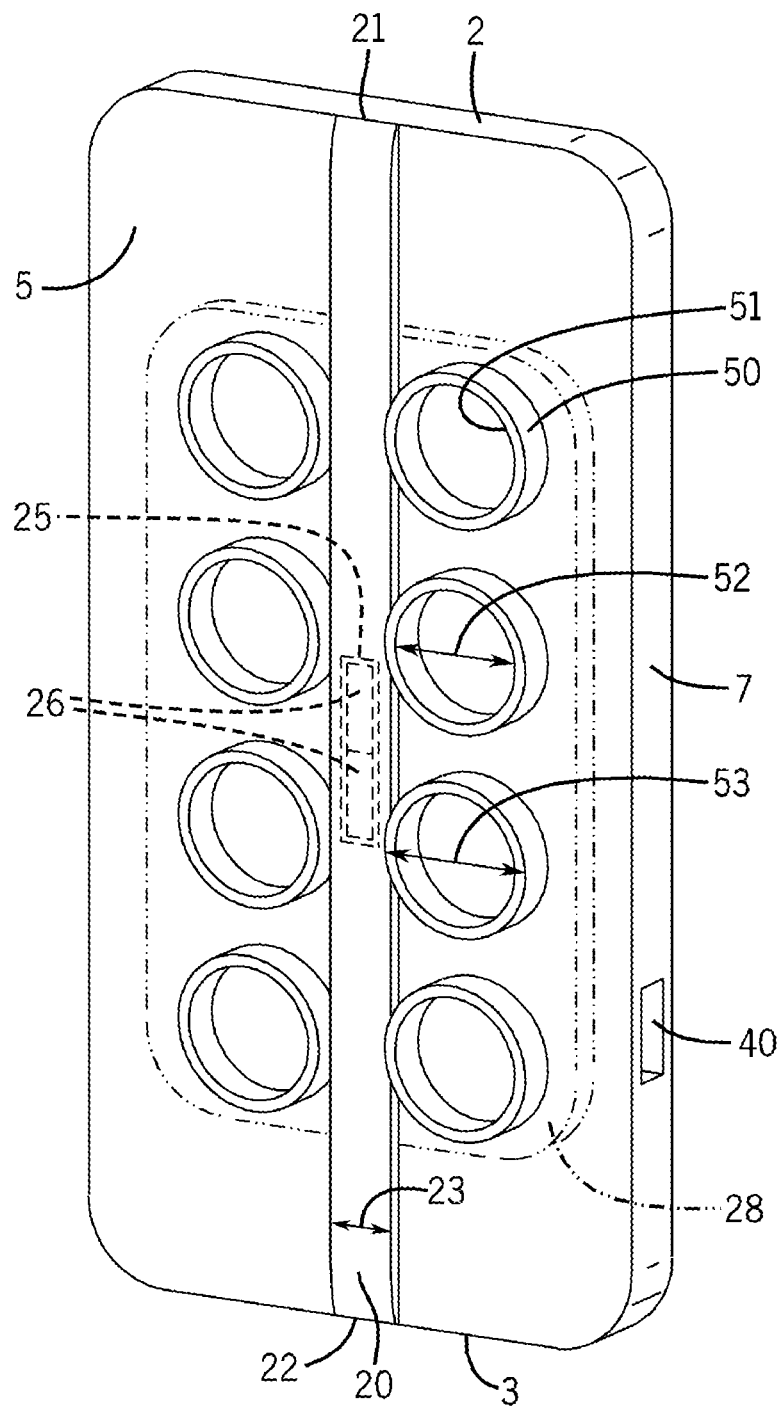
FIG. 2 illustrates a back view of the holding device for a phone wherein finger loops are in a First Position A.

Referring now to FIG. 2, in an embodiment, a plurality of finger loops 50 may be located on the top 2, bottom 3, first side 6, second side 7 or back 5 of the device 1. (FIG. 2 illustrates the finger loops 50 only on the back 5 of the device 1). Locating the finger loops 50 on the top 2, bottom 3, first side 6 or second side 7 of the device 1 (as opposed to the back 5) may help reduce the overall width of the cell phone 100 and holding device 1 combined. The finger loops 50 may move from a First Position A (FIG. 3) to a Second Position B (FIG. 4) as described below.

The finger loops 50 may be generally circular and may each have a generally circular opening 51. The generally circular openings 51 may be approximately half an inch to an inch in diameter and may vary depending on the size of the finger being used. The generally circular opening 51 may have a diameter 52 which is slightly less than a diameter 53 of the finger loops 50. More specifically, the finger loop 50 for the thumb may be larger on the device 1 than the finger loop 50 designed for the pinky.

In an embodiment, the device 1 may have a centrally located support divider 20. In an embodiment, the centrally located support divider 20 is made from an elastic material to slightly expand and contract. The centrally located support divider 20 may have a first end 21, a second end 22 and a width 23. In an embodiment, the centrally located support divider 20 may run substantially parallel to the first side 6 and the second side 7 of the device 1. Further, the centrally located support divider 20 may be located on the back 5 of the device 1. In an embodiment, the centrally located support divider 20 may have an interior 25 having magnets 26 which may allow the centrally located support divider 20 to remain secured to the back 5 of the device 1 by magnetically being attracted to the phone 100.

In an embodiment, only the first end 21 and second end 23 of the centrally located divider 20 is secured directly to the device 1. As a result, a user may slide a personal item 28 (such as a credit card) between the centrally located support divider 20 and the back 5 of the device 1; therein securing the personal item 28 to the back 5 of the device 1. Further, in an embodiment, a temporary adhesive material 73 (FIG. 5) may be located on a back 74 of the centrally located divider 20 so as to better secure the centrally located divider 20 to the back 5 of the device 1 or to the personal item 28.

The centrally located support divider 20 may provide a support mechanism for the finger loops 50 of the device 1. In an embodiment, the finger loops 50 may have a single point of contact with the centrally located support divider 20 and may be permanently secured to the centrally located support divider 20. As a result, the finger loops 50 may not only rotate upward upon a first axis into a largely perpendicular position with respect to the back 5 of the device 1 but may also rotate along a second axis (FIG. 4) axis being perpendicular to the upward rotational axis of the finger loops 50.

Referring now to FIG. 5, in an embodiment, the finger loops 50 may be located on the first side 81 of the centrally located support divider 20 and a second set of finger loops 50 may be located on the second side 82 of the centrally located support divider 20.

In an embodiment, the finger loops 50 may have a generally rectangular securing portion 83 having a slit 87. The length of the slit 87 may be slightly greater than the width 23 of the centrally located support divider 20 such that the centrally located support divider 20 may slide through the slit 87. The slit 87 of the finger loops 50 may allow the user the slide the finger loops 50 on or off the centrally located support divider 20 so as the user may elect which finger loops 50 and how many may be used in connection with the device 1. In this embodiment, the first end 21 and/or the second end 22 of the centrally located support divider 20 may not be permanently secured to the device 1 so as to allow the user to temporarily unsecure first end 21 or second end 22 of the centrally located support divider 20 to install or remove finger loops 50 and then re-secure the centrally located support divider 20 to the device 1. Therefore, the user may electively add or subtract finger loops 50 to the centrally located support divider 20.

In an embodiment, because the finger loops 50, generally rectangular securing portion 83 and/or centrally located support divider 20 are all flexible, the finger loops 50 may be rotated along multiple axes (x, y and z) with respect to the centrally located support divider 20 of the device 1 allowing a user to select the most favorable and comfortable orientation of the finger loops 50 with respect to the back 5 of the device 1.

To use the device 1, the user first inserts the phone 100 through the main opening 75 of the device 1 into the interior 8 of the device 1 and slightly stretches the housing of the device 1 around the phone 100. The phone 100 is then held in place in the interior 8 of the device 1 by, for example, friction. The user may then insert his/her fingers into the finger loops 50 of the device 1 to firmly hold the phone 100. The finger loops 50 may be adjusted in size, location, rotational axis, and number as described above. More specifically, when the finger loops 50 are rotated upward in the Second Position B (FIG. 4) the user may then insert his or her fingers through the openings 51 of the finger loops 50 to secure the device 1.

Figure 6:
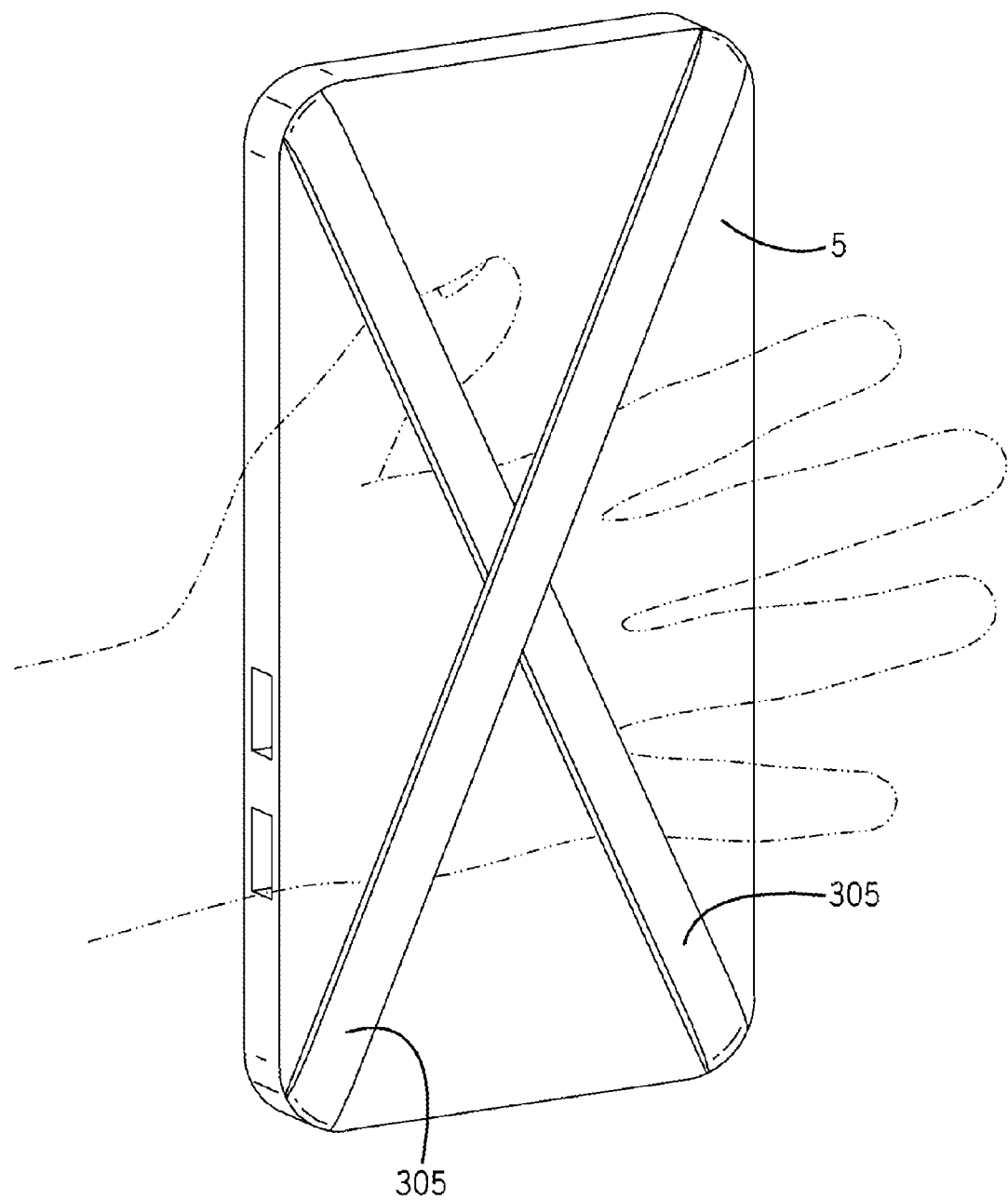
FIG. 6 illustrates an embodiment wherein straps on the back of the device lack finger loops.

Referring now to FIG. 6, in an embodiment, the device 1 may lack finger loops 50. Instead, a user may simply slide his or her hand between a strap 305 (or plurality of straps 305 as illustrated in FIG. 6) and the back 5 of the device 1. In this embodiment, the straps 305 allow the user to firmly grasp the device 1.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A device for holding an electronic device comprising:
a housing having a top, bottom, a front, a back, a first side, a second side and a generally hollow interior wherein an electronic device is inserted into the generally hollow interior of the device;
a support divider having a first end, a second end and a middle section wherein the first end and second end are secured to the housing; and
a plurality of generally circular loops secured to the support divider herein the generally circular loops have an opening for receiving a finger and wherein the plurality of generally circular loops may rotate along a first axis and second axis and wherein the first axis and second axis are perpendicular to each other.

2. The device for holding an electronic device of claim 1 further comprising an antibacterial agent incorporated into the housing.

3. The device for holding an electronic device of claim 1 wherein the middle section of the support divider is not secured to the housing.

4. The device for holding an electronic device of claim 1 further comprising:
an opening along the first side or second side of the housing wherein the opening allows a user to access an electronic port of the electronic device.

5. The device for holding an electronic device of claim 1 further comprising:
a magnet located within an interior of the support divider wherein the magnet secures the strap to the electronic device.

6. A device for holding an electronic device comprising:
a housing having a top, bottom, a front, a back, a first side, a second side and a generally hollow interior wherein an electronic device is inserted into the generally hollow interior of the device;
a support divider having a first end, a second end and a middle section wherein the first end and second end are secured to the housing;
a plurality of generally circular loops secured to the support divider herein the generally circular loops have an opening for receiving a finger and wherein the plurality of generally circular loops may rotate along a first axis and second axis and wherein the first axis and second axis are perpendicular to each other; and
a securing portion connected to each of the plurality of generally circular loops wherein the securing portion has a generally rectangular slit and wherein the support divider is slid through the generally rectangular slit of the securing portion and wherein the location of the plurality of generally circular loops may be moved with respect to the housing by sliding the plurality of generally circular loops along the support divider.

7. The device for holding an electronic device of claim 6 wherein a user may electively add or subtract one of the plurality of generally circular loops from the support divider by temporarily unsecuring the first end or second end of the support divider to add or subtract one or more of the plurality of generally circular loops and then resecuring the first or second end of the support divider to the housing.

8. The device for holding an electronic device of claim 6 wherein
the middle section of the support divider is not secured to the housing and wherein a user may place his or her hand between the middle section of the support divider and the back of the housing to hold the housing and the electronic device.

* * * * *